United States Patent
Grossmann et al.

(10) Patent No.: US 8,227,951 B2
(45) Date of Patent: Jul. 24, 2012

(54) PERMANENT-MAGNET SYNCHRONOUS MACHINE HAVING SKEWED MAGNETS FOR REDUCED TORQUE RIPPLE

(75) Inventors: Udo Grossmann, Oberstreu (DE); Rolf Vollmer, Gersfeld (DE); Michael Zastrow, Salz (DE)

(73) Assignee: Siemens Aktiengesellschaft, München (DE)

( * ) Notice: Subject to any disclaimer, the term of this patent is extended or adjusted under 35 U.S.C. 154(b) by 442 days.

(21) Appl. No.: 12/492,312

(22) Filed: Jun. 26, 2009

(65) Prior Publication Data

US 2009/0322174 A1    Dec. 31, 2009

(30) Foreign Application Priority Data

Jun. 27, 2008 (EP) ..................... 08011716

(51) Int. Cl.
*H02K 21/12* (2006.01)
*H02K 1/22* (2006.01)

(52) U.S. Cl. ......... 310/156.47; 310/156.43; 310/156.44; 310/156.45; 310/156.01; 310/261.1; 310/156.12; 310/156.83

(58) Field of Classification Search ............. 310/156.43–156.47, 156.55, 261.1, 310/156.83, 156.01, 156.12; H02K 1/22, H02K 21/12
See application file for complete search history.

(56) References Cited

U.S. PATENT DOCUMENTS

| | | | |
|---|---|---|---|
| 6,876,113 B1 * | 4/2005 | Harris | 310/114 |
| 7,067,948 B2 * | 6/2006 | Yamaguchi et al. | 310/156.47 |
| 7,196,445 B2 * | 3/2007 | Yamaguchi et al. | 310/156.47 |
| 2002/0067092 A1 * | 6/2002 | Crapo et al. | 310/156.47 |
| 2005/0023919 A1 * | 2/2005 | Nakano et al. | 310/156.47 |
| 2005/0121990 A1 * | 6/2005 | Kaneko | 310/156.47 |
| 2006/0055266 A1 * | 3/2006 | Iwami et al. | 310/156.47 |
| 2006/0290220 A1 | 12/2006 | Dellinger et al. | |
| 2007/0170800 A1 * | 7/2007 | Okubo | 310/156.12 |
| 2007/0205689 A1 * | 9/2007 | Nemoto et al. | 310/156.47 |
| 2008/0218023 A1 * | 9/2008 | Niguchi et al. | 310/156.55 |
| 2009/0184602 A1 * | 7/2009 | Braun et al. | 310/216.112 |
| 2010/0133940 A1 * | 6/2010 | Grossmann et al. | 310/156.46 |

FOREIGN PATENT DOCUMENTS

| | | |
|---|---|---|
| DE | 103 48 401 A1 | 5/2004 |
| DE | 10 2005 022548 A1 | 11/2006 |
| EP | 1 389 821 A1 | 2/2004 |
| WO | WO 91/16754 A1 | 10/1991 |
| WO | WO 2004/109894 A1 | 12/2004 |
| WO | WO 2006 029990 A1 | 3/2006 |
| WO | WO2006032635 * | 3/2006 |

OTHER PUBLICATIONS

Machine translation of WO2006032635, Braun et al, Mar. 2006.*
Nicola Bianchl et al:, IEEE Transactions on Industry Applications, IEEE Service Center, Piscataway, NJ, US, vol. 38, No. 5, Sep. 1, 2002; XP011073515; ISSN: 0093-9994; Others.

* cited by examiner

*Primary Examiner* — Quyen Leung
*Assistant Examiner* — Terrance Kenerly
(74) *Attorney, Agent, or Firm* — Henry M. Feiereisen; Ursula B. Day

(57) ABSTRACT

In a three-phase permanent-magnet synchronous machine, a pole gap and a skew of permanent magnets on the rotor are designed such that oscillating torques which are caused by the fifth and seventh harmonics of the stator field and of the rotor field are mutually reduced. In particular, the skew can be chosen as a function of the pole gap, such that the majority of the respective oscillating torques is neutralized. This results in minimal torque ripple.

10 Claims, 3 Drawing Sheets

US 8,227,951 B2

PERMANENT-MAGNET SYNCHRONOUS MACHINE HAVING SKEWED MAGNETS FOR REDUCED TORQUE RIPPLE

CROSS-REFERENCES TO RELATED APPLICATIONS

This application claims the priority of European Patent Application, Serial No. EP 08011716, filed Jun. 27, 2008, pursuant to 35 U.S.C. 119(a)-(d), the content of which is incorporated herein by reference in its entirety as if fully set forth herein.

BACKGROUND OF THE INVENTION

The present invention relates to a permanent-magnet synchronous machine which is designed for three-phase operation.

The following discussion of related art is provided to assist the reader in understanding the advantages of the invention, and is not to be construed as an admission that this related art is prior art to this invention.

A typical three-phase permanent-magnet synchronous machine (with permanent magnet excitation) has a stator in which each tooth is surrounded by a winding and which has a number of holes q=½, as well as a rotor, on which permanent magnets are arranged with a pole gap in the circumferential direction and with a skew with respect to the axial direction. The permanent-magnet synchronous machine has torque ripples which are caused in particular by the fifth and seventh harmonics of the stator and rotor fields. The number of holes corresponds hereby to the number of stator slots N1 divided by three times the number of the poles 2p, i.e. q=N1/(3×2p). This therefore results, for example, in a torque ripple when the fifth harmonic of the rotor field is coupled to the fifth harmonic of the stator field, and the rotation speed of the two fields is different to the rotor rotation speed.

A large pole gap between the magnet poles is beneficial in order to simplify the manufacturing technology. However, the harmonics are particularly high, and therefore also the oscillating torques caused by them, when the pole gaps are between 20% and 42.9% of the pole pitch $\tau_p$. Until now, scarcely any machines have therefore been produced with a number of holes q=½, which have pole gaps in this range.

With regard to the torque ripple, measures have generally been taken until now to reduce or eliminate the fifth and seventh harmonics of the rotor. This can be realized, for example, by a targeted pole coverage of the rotor with magnets and/or skewing or staggering of the magnets. International patent document WO 2004/109894 A1 discloses a permanent-magnet synchronous motor in which the fifth harmonic of the rotor field is cancelled out by skewing through half the slot pitch 0.5×Tn or by skewing by ⅗×Tn, wherein Tn refers to the slot pitch. The seventh harmonic of the rotor field is cancelled out by a skew of 3/7×Tn. The combination of this skew of 60% of a slot pitch Tn with a pole coverage of 85% leads both to complete damping or cancellation of the fifth harmonic and of the seventh harmonic. The combination of the skew of 3/7×Tn with a pole coverage of about 80% also leads both to complete damping or cancellation of the fifth harmonic and of the seventh harmonic.

It would be desirable and advantageous to provide an improved three-phase permanent-magnet synchronous machine to obviate prior art shortcomings and to extend their design freedom.

SUMMARY OF THE INVENTION

According to one aspect of the present invention, a permanent-magnet synchronous machine for three-phase operation includes a stator having plural teeth, each tooth surrounded by a winding, said stator having a number of holes q=½, and a rotor defining an axis and having permanent magnets arranged in a circumferential direction with a pole gap in a range from 20% to 42.9% in relation to a pole pitch, the rotor having a skew with a skew angle on an axial projection in the circumferential direction of 40% to 57.2%, in relation to the pole pitch, wherein a ratio of the skew angle/pole pitch to a ratio of the pole gap/pole pitch is schdpt=−0.75×pldpt+72.2%, with schdpt being the ratio of the skew angle/pole pitch, and pldpt being the ratio of the pole gap/pole pitch, and wherein the pole gap and the skew are designed such that oscillating torques caused by the fifth and seventh harmonics of a stator field and of a rotor field are mutually reduced. As soon as the skew angle and the pole gap satisfy this function, virtually complete compensation for the oscillating torques can be expected.

According to another aspect of the present invention, a permanent-magnet synchronous machine for three-phase operation includes a stator having plural teeth, each tooth surrounded by a winding, said stator having a number of holes q=½, and a rotor defining an axis and having permanent magnets arranged in a circumferential direction with a pole gap in a range from 20% to 42.9% in relation to a pole pitch, the rotor having a skew with a skew angle on an axial projection in the circumferential direction of 40% to 57.2%, in relation to the pole pitch, wherein a ratio of the skew angle/pole pitch to a ratio of the pole gap/pole pitch is 0.75×pldpt+72.2% to 0.75×pldpt+72%−10%, with schdpt being the ratio of the skew angle/pole pitch, and pldpt being the ratio of the pole gap/pole pitch, and wherein the pole gap and the skew are designed such that oscillating torques caused by the fifth and seventh harmonics of a stator field and of a rotor field are mutually reduced. A tolerance band is therefore defined in which the oscillating torques of the fifth and seventh harmonics are very largely compensated for, as a result of which only a very low torque ripple can still be expected, that is to say a PM synchronous machine of high quality.

This synchronous machine advantageously makes it possible to use relatively large pole gaps. In other words, the pole coverage can be kept low and yet the torque ripple can be kept as low as possible.

According to another advantageous feature of the present invention, the oscillating torques caused by the fifth and seventh harmonics of the stator field and of the rotor field may essentially compensate for one another. In a virtually optimum manner, this makes use of the fact that the oscillating torques which are caused by the fifth harmonics are in the opposite sense to those which are caused by the seventh harmonics.

According to another advantageous feature of the present invention, a basic number of rotor pole pairs in the synchronous machine may correspond to a basic number of stator pole pairs.

According to another advantageous feature of the present invention, the permanent magnets may be staggered for the skew in the circumferential direction. This makes it possible to skew the permanent magnets on the rotor in a cost-effective manner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
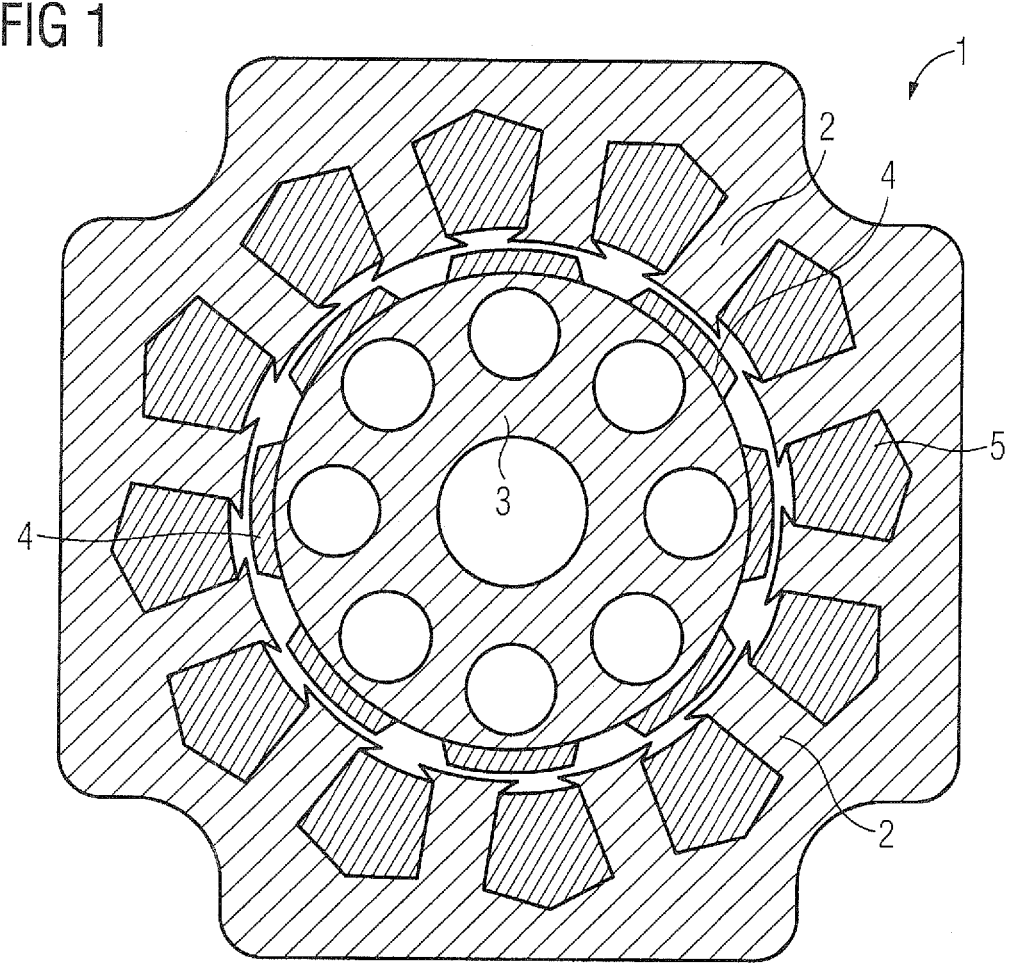
FIG. 1 is a cross section of a permanent-magnet (PM) synchronous machine having a twelve-pole stator and an eight-pole rotor.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross section of a permanent-magnet (PM) synchronous machine having a stator 1 with twelve poles 2 and a rotor 3 which is disposed in the interior of the stator 1 and has eight poles, which are represented by eight permanent magnets 4.

Figure 2:
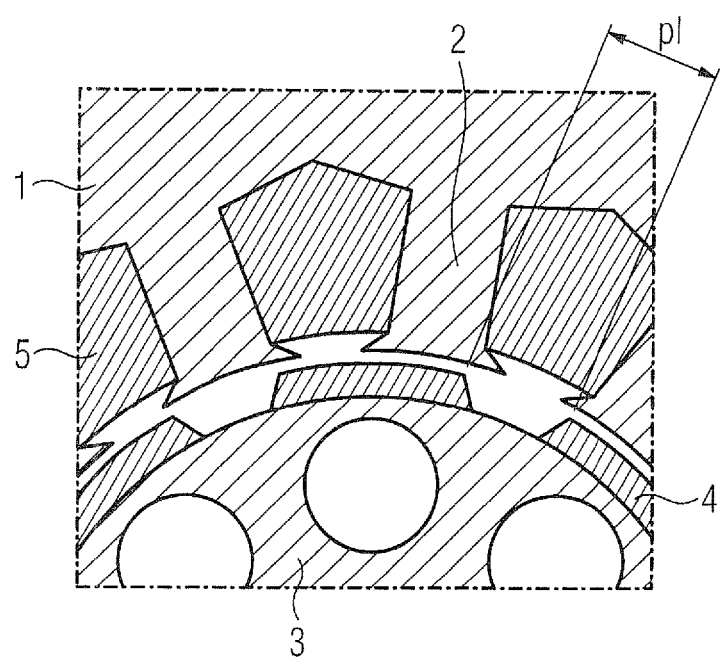
FIG. 2 shows an enlarged detail of the permanent-magnet synchronous machine from FIG. 1.

FIG. 2 shows an enlarged detail from FIG. 1. In this case as well, the stator 1 with its teeth 2 and the rotor 3 with its permanent magnets 4 can once again be seen. The teeth 2 on the stator 1 are wound with windings 5, which are not illustrated in any more detail. However, a pole gap p1 can also be seen in particular in FIG. 2. The pole gap can be quantified by an angle in the circumferential direction.

Figure 3:
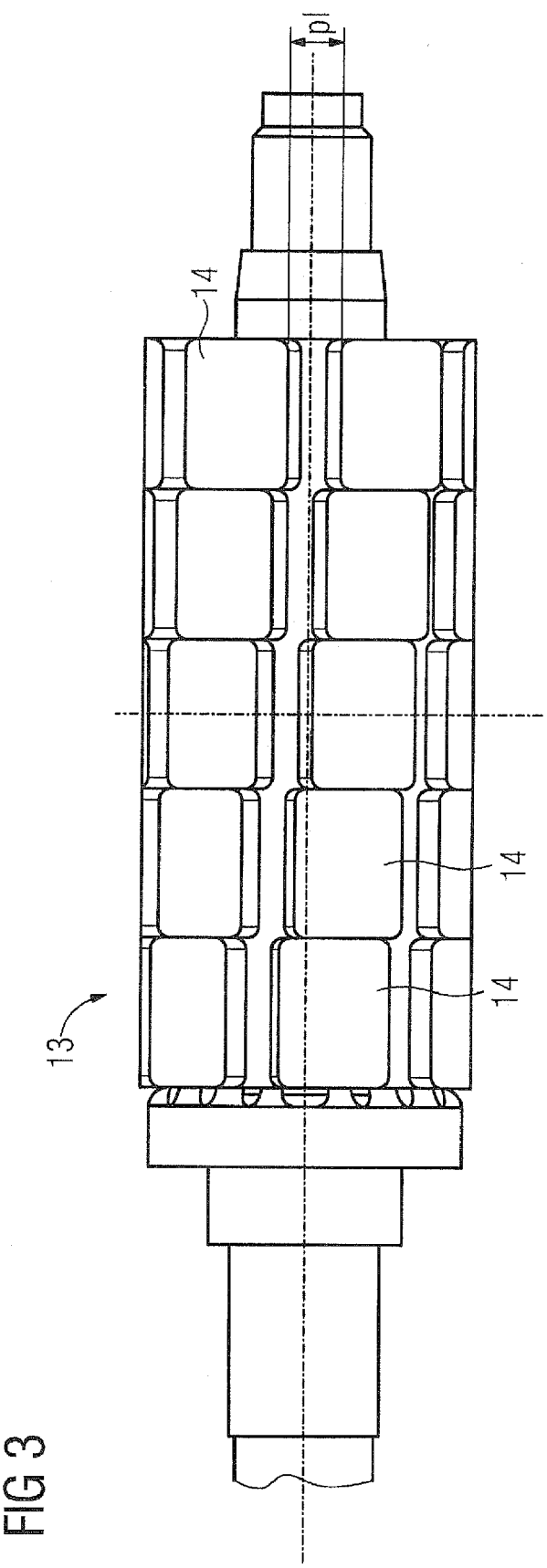
FIG. 3 shows a plan view of a six-pole rotor according to the invention.

According to the invention, in addition to the specific design of the pole gaps, a specific skew or stagger of the magnets is also implemented in order to reduce the torque ripple. Such staggering of the magnets is illustrated in FIG. 3 on the basis of a six-pole rotor. The present invention is therefore not restricted to eight-pole rotors as shown in FIGS. 1 and 2, but can be applied to rotors with any desired number of poles.

The longitudinal side view of the rotor 13 in FIG. 3 shows a plurality of individual magnets 14, which are arranged to form oblique magnet rows in the axial direction. The magnet rows are at a distance from one another which corresponds to the pole gap p1. In the present case, the pole gap p1 is approximately 30% of the pole pitch $\tau_p$. The latter represents the angle between two permanent magnets 17 which are adjacent in the circumferential direction. The pole gap p1 corresponds to the size of the angle in the circumferential direction which is defined by the distance between two permanent magnets 14 which are adjacent in the circumferential direction.

As can also be seen from FIG. 3, two permanent magnets 14 which are adjacent in the axial direction are offset in the circumferential direction by a stagger angle α. In the present example with a total of five permanent magnets along the axis of the rotor 13, a stagger angle of α=5.4° results in a skew angle of 27°. If, for example, eight permanent magnets 14 are arranged along the axis of the rotor 13, then this would result, for example, in a skew angle of 26° for a stagger angle of α=3.25°.

Figure 4:
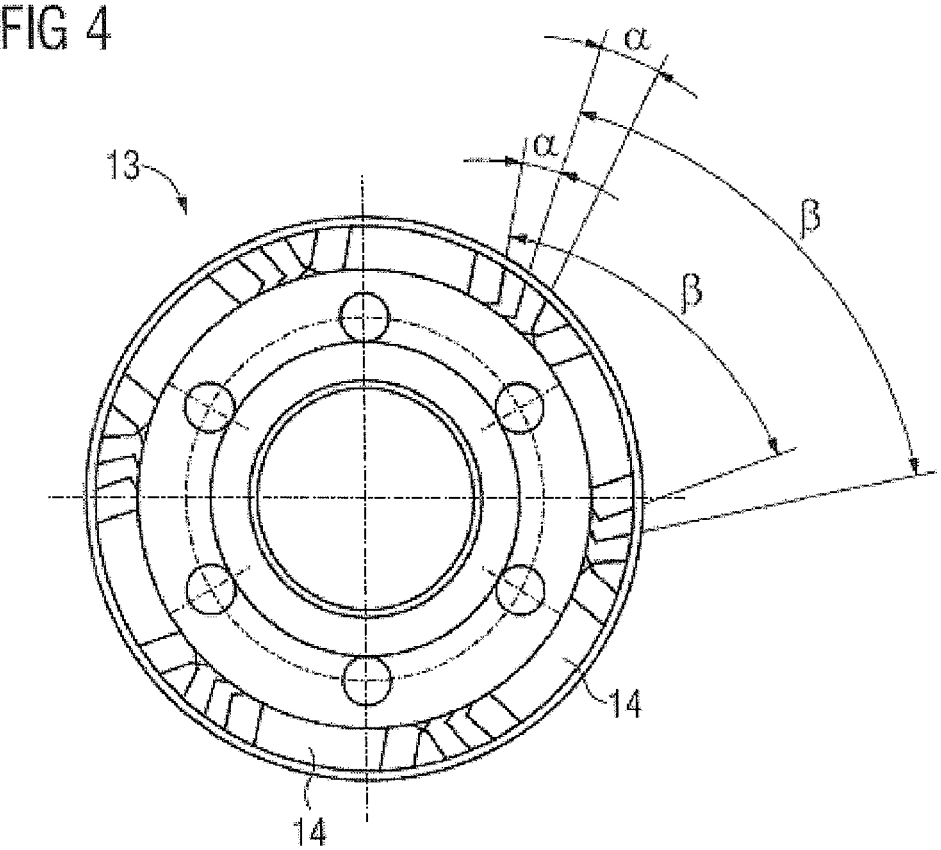
FIG. 4 shows an end-face view of the rotor shown in FIG. 3.

FIG. 4 shows an end-face view of the rotor shown in FIG. 3. The sizes of the angles of the staggers of the permanent magnets 14 can be seen well in this view. Specifically, in this view, the skew or stagger of the permanent magnets 14 in the axial direction is projected onto a plane transversely with respect to the axis. The stagger angle α can therefore be seen between two axially adjacent permanent magnets 14. Furthermore, the angle β denotes the pole pitch $\tau_p$.

In the prior art, skews and pole gaps were designed such that the harmonics and in particular the fifth and seventh harmonics of the rotor are as low as possible.

Plotted on a two-dimensional diagram in which the ordinate represents the skew with respect to the pole pitch and the abscissa the pole gap with respect to the pole pitch, it was therefore possible to use only the area A. The relative pole gap in this area is relatively small, and is essentially less than 20%.

However, the aim of the present invention is not to eliminate the individual field characteristics but to make use of suitable measures to exploit the large harmonics of the rotor field in order to mutually reduce the individual oscillating torques. To this end, the aim is that the values of the oscillating torque $M_5$ of the fifth harmonics and the oscillating torque $M_7$ of the seventh harmonics should as far as possible have the same amplitudes, but opposite directions (phase shift of 180°). The oscillating torques caused by the fifth harmonics of the stator field and rotor field are at the same frequency as the oscillating torques which are caused by the seventh harmonics. The frequency corresponds to six times the electrical fundamental frequency.

The stators of the PM synchronous machine illustrated here in general have N1 slots and teeth. A coil is wound around each tooth. The basic number of pole pairs of the winding system is $p_{GW}$, and the number of holes is q=½. The rotor 3 or 13, respectively is for this purpose fitted with respective permanent magnets 4 and 14 on the rotor surface. The permanent magnets 4, 14 are magnetized such that the basic number of rotor pole pairs is equal to the basic number of stator pole pairs, that is to say $p_{GR}=p_{GW}$. However, a pole gap is now left between the individual magnet poles, amounting to between 20% and 42.9% of a pole pitch. The permanent magnets 4, 14 are staggered or skewed on the rotor 3, 13 as a function of the width of the pole gap.

Figure 5:
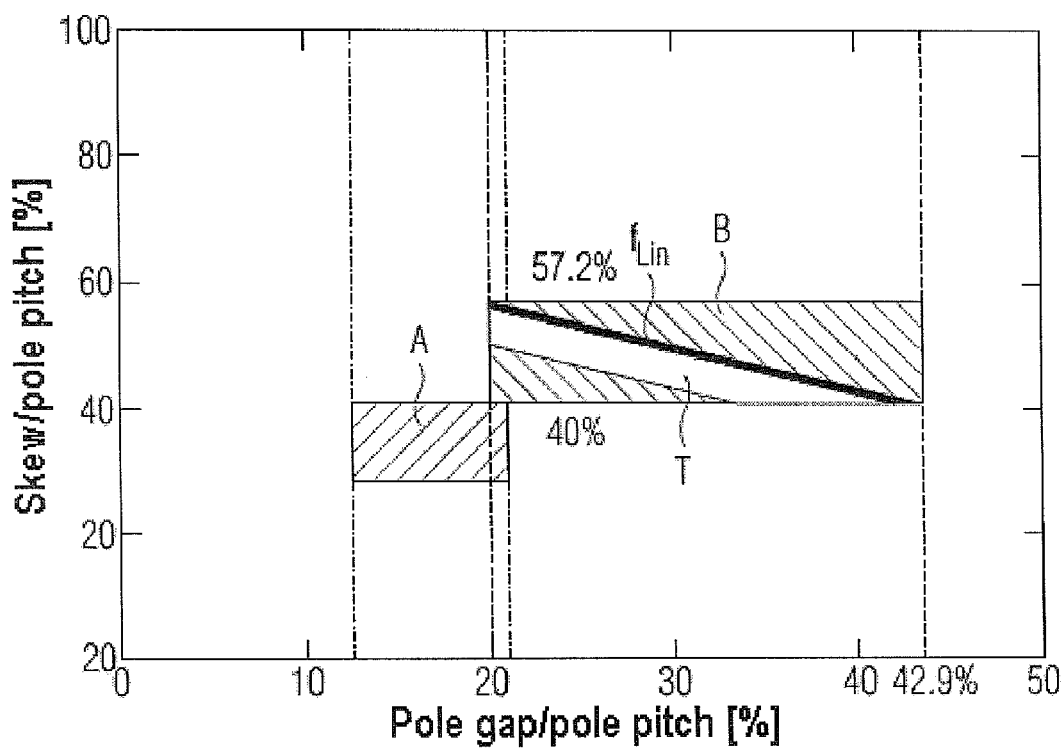
FIG. 5 shows a diagram to illustrate an extended useful range of a PM synchronous machine, as a function of the skew and pole gap.

FIG. 5 shows an area B which has a very low level of torque ripple for said pole gap range. A relative skew of between 40% and 57.2% can accordingly be chosen in this area. In accordance with the fundamental idea on which the invention is based, the oscillating torques of the fifth and seventh harmonics are subtracted in this area B. Thus, in this area, the oscillating torques essentially have the same values and neutralize one another, since they are in opposite directions.

The two oscillating torques neutralize one another completely on a specific curve through the area B. The function which indicates the relative skew schdpt (skew/pole pitch) as a function of the relative pole gap pldpt (pole gap/pole pitch) at which the compensation for the oscillating torques is theoretically complete can be approximated by the following linear function:

$$\text{schdpt}=-0.75\times\text{pldpt}+72.2\%.$$

This linear function is indicated by the straight line $f_{lin}$ within the area B in FIG. 5. Furthermore, a tolerance band can be specified in the area B, within which the torque ripple is still sufficiently good, since the corresponding oscillating torques very largely compensate for one another. In the area B, this tolerance band T is limited at the top by the function $f_{lin}$, and reaches 10% points of this function $f_{lin}$. This means that the tolerance band T is bounded at the bottom by the straight line $-0.75 \times pldpt+72.2\%-10\%$. According to the example shown in FIG. 3, the rotor is in the tolerance band T defined above. Specifically, its relative pole gap pldpt is at 30%, and its relative skew angle, which is approximated by the stagger, is 45%=27°/60°. A synchronous machine with the rotor shown in FIG. 3 will accordingly have relatively low torque ripple.

Overall, it can therefore be stated that the mutual neutralization achieved according to the invention of two oscillating torques of equal magnitude results in low overall torque ripple. This widens the worthwhile design freedom for designing said machine type. Rotors are accordingly also possible which, despite having large pole gaps (for example pldpt=30%) produce little torque ripple. A further advantage of these rotors with large pole gaps is that they require less magnetic material and can also be magnetized more easily.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A permanent-magnet synchronous machine for three-phase operation, comprising:
    a stator having plural teeth, each tooth surrounded by a winding, said stator having a number of holes $q=\frac{1}{2}$ which is defined as $q=N1/(3\times 2p)$, wherein N1 is the number of stator slots; 3 is the number of phases; and 2p is the number of poles of the rotor; and
    a rotor defining an axis and having permanent magnets arranged in a circumferential direction with a pole gap in a range from 20% to 42.9% in relation to a pole pitch, the rotor having a skew with a skew angle on an axial projection in the circumferential direction of 40% to 57.2%, in relation to the pole pitch,
    wherein a ratio of the skew angle/pole pitch to a ratio of the pole gap/pole pitch is schdpt=−0.75×pldpt+72.2%, with schdpt being the ratio of the skew angle/pole pitch, and pldpt being the ratio of the pole gap/pole pitch, and
    wherein the pole gap and the skew are designed such that oscillating torques caused by the fifth and seventh harmonics of a stator field and of a rotor field are mutually reduced.

2. The synchronous machine of claim 1, wherein the oscillating torques caused by the fifth and seventh harmonics of the stator field and of the rotor field substantially compensate one another.

3. The synchronous machine of claim 1, wherein the permanent magnets are staggered in the circumferential direction for providing the skew.

4. The synchronous machine of claim 1, wherein the permanent magnets are arranged in a circumferential direction with a uniform pole pitch and a uniform pole gap irrespective of a position of the permanent magnets on the rotor along the rotor axis.

5. The synchronous machine of claim 1, wherein the stator has 9 pole teeth and the rotor has 3 pole pairs (2p=6).

6. A permanent-magnet synchronous machine for three-phase operation, comprising:
    a stator having plural teeth, each tooth surrounded by a winding, said stator having a number of holes $q=\frac{1}{2}$ which is defined as $q=N1/(3\times 2p)$, wherein N1 is the number of stator slots; 3 is the number of phases; and 2p is the number of poles of the rotor; and
    a rotor defining an axis and having permanent magnets arranged in a circumferential direction with a pole gap in a range from 20% to 42.9% in relation to a pole pitch, the rotor having a skew with a skew angle on an axial projection in the circumferential direction of 40% to 57.2%, in relation to the pole pitch,
    wherein a ratio of the skew angle/pole pitch to a ratio of the pole gap/pole pitch is −0.75×pldpt+72.2% to −0.75×pldpt+72%-10%, with schdpt being the ratio of the skew angle/pole pitch, and pldpt being the ratio of the pole gap/pole pitch, and
    wherein the pole gap and the skew are designed such that oscillating torques caused by the fifth and seventh harmonics of a stator field and of a rotor field are mutually reduced.

7. The synchronous machine of claim 6, wherein the oscillating torques caused by the fifth and seventh harmonics of the stator field and of the rotor field substantially compensate one another.

8. The synchronous machine of claim 6, wherein the permanent magnets are staggered in the circumferential direction for providing the skew.

9. The synchronous machine of claim 6, wherein the permanent magnets are arranged in a circumferential direction with a uniform pole pitch and a uniform pole gap irrespective of a position of the permanent magnets on the rotor along the rotor axis.

10. The synchronous machine of claim 6, wherein the stator has 9 pole teeth and the rotor has 3 pole pairs (2p=6).

* * * * *